United States Patent [19]

Jones et al.

[11] 3,970,148
[45] *July 20, 1976

[54] METHOD FOR STIMULATING WELLS COMPLETED IN OIL BEARING EARTH FORMATIONS

[75] Inventors: Loyd W. Jones; George B. Holman, both of Tulsa, Okla.

[73] Assignee: Standard Oil Company, Chicago, Ill.

[ * ] Notice: The portion of the term of this patent subsequent to June 25, 1991, has been disclaimed.

[22] Filed: Oct. 29, 1974

[21] Appl. No.: 518,441

[52] U.S. Cl. ............................. 166/307; 166/304; 252/8.55 B; 252/8.55 C
[51] Int. Cl.$^2$ ...................................... E21B 43/27
[58] Field of Search ................. 252/8.55 C, 8.55 B; 166/304, 307

[56] References Cited
UNITED STATES PATENTS

| | | | |
|---|---|---|---|
| 2,024,718 | 12/1935 | Chamberlain | 252/8.55 C |
| 2,124,530 | 7/1938 | Loomis et al. | 166/307 |
| 2,356,205 | 8/1944 | Blair et al. | 252/8.55 B |
| 3,481,404 | 12/1969 | Gidley | 166/307 |
| 3,819,520 | 6/1974 | Jones et al. | 252/8.55 C |

*Primary Examiner*—Herbert B. Guynn
*Attorney, Agent, or Firm*—Robert B. Stevenson; Paul F. Hawley

[57] ABSTRACT

A method for cleaning and stimulating an oil, gas or injection well, in which wax, tar and/or bituminous materials are either already deposited or would be precipitated by the injection of an acidizing solution consisting of a mixture of an octanol and a lower alcohol with an aqueous acid solution, involving the injection of an aromatic solvent either before and/or after the alcohol-acidizing solution. To enhance the interfacial miscibility of the aromatic solvent and the alcohol-acidizing solution, a small amount of amine having no more than eight carbon atoms may be added to the aromatic solvent. This method is useful in both production and injection wells.

11 Claims, 1 Drawing Figure

METHOD FOR STIMULATING WELLS COMPLETED IN OIL BEARING EARTH FORMATIONS

BACKGROUND OF THE INVENTION

The field of this invention relates to an improved process for acidizing oil wells in which asphaltene or other heavy hydrocarbon type deposits are either present or potentially a problem. Thus, this improved process is not only useful in cleaning and stimulating oil wells in which production has been reduced because of the heavier fractions depositing near the face of the wellbore, but it is also useful in preventing such problems when it is known that the presence of an aqueous flush would induce asphaltene precipitation.

In the recently issued U.S. Pat. No. 3,819,520 (incorporated herein by reference), we disclosed and claimed a new acidizing composition with improved oil displacing ability capable of leaving solid surfaces water-wet without forming emulsions. These improved functions were shown to be related to low interfacial tensions between the aqueous acid solution in the presence of the alcohols and a hydrocarbon having from 10 to 12 carbon atoms per molecule. Although the improved acidizing compositions of U.S. Pat. No. 3,819,520 are useful in stimulating many wells and, in principle, should lead to improved oil displacement in all applications, certain problem wells have remained, stubbornly resisting all attempts to restore them to their original production flow rates. In particular, wells which are producing from formations containing crude oil having a high concentration of asphaltenes and other heavy hydrocarbon components tend to form a "skin" at or near the wellbore which will not dissolve in the alcohol-acidizing process. In solving this problem, we have discovered an improved method of using the alcohol-acidizing composition claimed in U.S. Pat. No. 3,819,520 which cleans and stimulates such problem wells. In one notable instance, a well which had for over four years resisted all attempts to stimulate production was virtually restored to its original state by our improved process.

SUMMARY OF THE INVENTION

We have discovered a process for cleaning and stimulating an oil well in which an objectionable deposit of a wax, tar or bituminous material is either present or likely to form, the improvement comprising of introducing into said well and into said deposit an aromatic hydrocarbon either before and/or after injecting into said well an acidizing composition consisting essentially of from 30 to about 76 volume percent of an aqueous solution of a well acidizing nonoxidizing water-soluble acid and from about 70 to about 24 volume percent of a mixture of an octyl alcohol and a lower aliphatic alcohol selected from the group consisting of ethanol, the propyl alcohols and teritary butyl alcohol, said octyl alcohol constituting at least about 2 volume percent of said composition and said aliphatic alcohol being present in a concentration of at least about 22 volume percent of said composition, said composition being capable of lowering the interfacial tension between the oil in said formation and said composition without the use of an added surface-active agent.

As indicated above, the principle application of our process is to oil-producing wells and to injection wells in waterflooding operations in which wax, tar and/or bituminous materials have deposited or potentially could deposit and reduce the permeability of the rock formation. The improved process is of particular utility in the case of oil producing wells which have had a previous history involving chronic water, scale or emulsion damage. However, gas wells having similar problems can benefit from our cleaning and stimulating process.

Thus, the primary object of this invention is to improve the usefulness of a mixed alcohol-acid solution in cleaning and stimulating wells in which heavy hydrocarbon deposits are a problem.

BRIEF DESCRIPTION OF THE DRAWING

The drawing is a ternary diagram showing compositions of isooctyl alcohol, isopropyl alcohol, and 15 percent aqueous hydrochloric acid solution which form a single phase.

DESCRIPTION OF THE PREFERRED EMBODIMENTS

Figure 1:
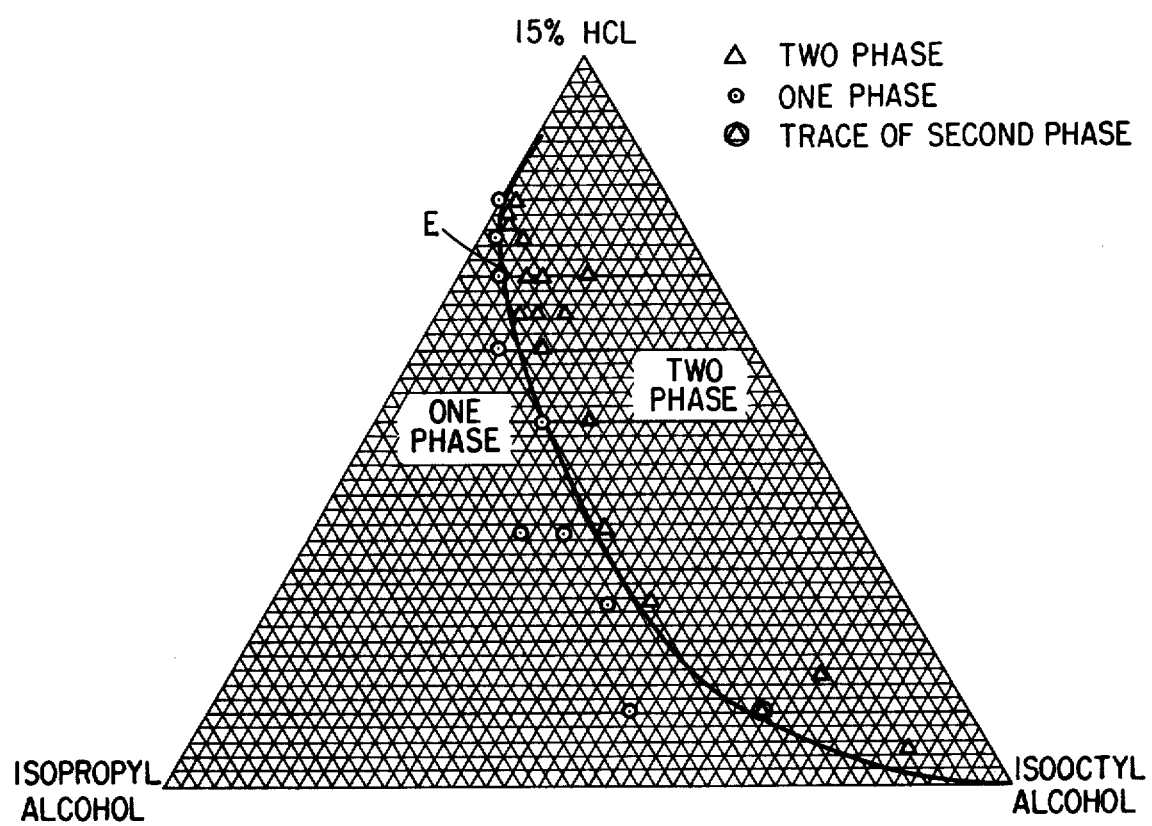

The aromatic hydrocarbon solvent employed preferably involves a predominance of one or more of the monocyclic aromatics, such as benzene, toluene, xylene, a mixed xylene refinery product, mixtures of these materials such as found in an aromatic rich refinery cut, or ultraformate which typically contains about 50 percent aromatics. Napthalene and polycyclic aromatics are useful for the process but generally, because of their higher melting points, are not as conveniently used alone. However, they may be admixed with the monocyclic aromatics.

The aromatic solvent may be diluted with nonaromatic hydrocarbons such as wellhead condensates or refinery distillates. As little as ten volume percent of benzene, xylene, toluene or mixed aromatic distillates added to aliphatic hydrocarbon fractions such as kerosene will enhance the solubility of asphaltenes, waxes and bituminous matter to such an extent that the mixture will be operative for the purposes of our invention.

Interfacial miscibility between the aromatic solvent and the alcohol-acid solutions is important in that it is desirable that no interfacial tension impede the movement of the alcohol-acid into the rock invaded by the aromatic solvent. In order to enhance the interfacial miscibility, from about 0.05 to about 1.0 volume percent of an organic amine having less than eight carbon atoms per molecule, such as butylamine, hexylamine and the like, may be added to the aromatic solvent. When contacted by the alcohol-acid solution, the amine is converted to an acid salt promoting mutual solubility between the phases. Amines larger than about eight carbons should not be used since they tend to stabilize emulsions and render the rock surfaces hydrophobic or nonwater wet. Alicyclic and aromatic amines, as well as aliphatic amines, can be employed provided the eight carbons or less limitation is satisfied.

As previously stated, our improved process can be used to treat oil producing wells or water injection wells in a waterflooding process of an oil-bearing formation. In either a producing or injection well, the aromatic hydrocarbon can precede or follow the alcohol-acid treatment and frequently be used advantageously before and after. The principle advantage of preceding the alcohol-acid injection with an aromatic hydrocarbon is that the aromatic hydrocarbon has an opportunity to both dissolve any existing asphaltene deposits and inhibit any further precipitation of asphaltenes. The value of having the aromatic hydrocarbon follow the alcohol-acid injection is that the aromatic solvent can dissolve any precipitate that forms. Whenever further precipitation of asphaltenes and the like can be predicted, it is preferred that the aromatic hydrocarbon introduction to the well precede the acidizing step.

The amount of aromatic hydrocarbon to be introduced will vary according to the dimensions and nature of the particular well. In the case of a producing well, the zone immediately surrounding the wellbore is of primary interest, so that volumes from about 500 to about 5,000 gallons are usually sufficient. In the case of an injection well, a greater volume may be necessary and an amount corresponding to from about 10 to about 500 gallons of solvent per foot of formation to be treated is satisfactory.

The acidizing fluids of our improved process are essentially the mixed alcohols and aqueous acid compositions of U.S. Pat. No. 3,819,520 having improved oil displacing ability. In general, these compositions involve either incorporating a mixture of alcohols in the acid solution or having the acid solution preceded and/or followed by a mixture of alcohols. Specifically, the mixed alcohols are made up of an octanol and a lower alcohol which may be ethanol, a propanol, or tertiary butanol. Preferably, the octanol is the mixture commercially available as isooctyl alcohol. The use of these mixed alcohols in conjunction with an aqueous acid results in lower interfacial tension between the acidizing fluid and oil leading to improved displacement of oil by acid. Further, the mixed alcohol-acid solution destroys existing emulsions, prevents creation of new emulsions and promotes water wetting of formation surfaces.

Since the octyl alcohols are substantially water-insoluble, there are solubility problems in use of the combination of alcohols with acids. These are shown in the drawing which indicates that at least about 22% of the lower alcohol must be used to solubilize as little as 2% of the octanols in the acid. However, use of only a little more of the lower alcohol, 30%, solubilizes 20% of the mixed octanols. A preferred composition is indicated as point E of the drawing. This contains about 5% by volume of isooctyl alcohol, about 25% of isoopropyl alcohol, about 70% of 15% hydrochloric acid. In field use, it is often preferable to use 5.8% isoctyl alcohol, 29% isopropyl alcohol and 65% of 15% hydrochloric acid.

The preferred octanol is available commercially under the tradename "Isooctyl Alcohol." This material is actually a mixture of alcohols which are almost entirely octanols. These octanols are nearly all branched. Single octanols may be used if desired, however. Small amounts, up to about 10%, of the other alcohols can be tolerated, particularly if they are close to the octanols in molecular weight. The octanols should be unsubstituted and aliphatic or alicyclic. They may be saturated or unsaturated.

There are a few alternates to isopropyl alcohol. Methanol has too little solubilizing action for the octanols. Therefore, methanol should not be considered an alternate of isopropanol. Ethanol and normal propanol can both be used. Of the butanols, only tertiary butanol can be used, the solubility of all other butanols in aqueous acid solutions being much too low. Thus, the class of satisfactory lower alcohols includes only ethanol, isopropyl alcohol, normal propanol, and tertiary butanol. Of these, isopropyl alcohol is greatly preferred, not only for its solvent characteristics, but also because of its low cost. The lower alcohols can be used singly or mixed. Thus, reference herein to "a lower alcohol" is intended to include not only a single alcohol, but also mixtures of alcohols. Up to about 10% of impurities can be present in the lower alcohols. These may include other water-soluble alcohols, other water-soluble organic solvents, or the like.

The solution of acid to which the alcohols are added may be almost any of the aqueous solutions of water-soluble acids and their mixtures commonly employed for acidizing formations. These may include aqueous solutions of hydrochloric acid, formic acid, acetic acid, hydrofluoric acid, or the like, but should not include nitric acid because of the strong oxidizing effect of this acid on alcohols. Any of the water-soluble, non-oxidizing acids ordinarily used for well acidizing can be used. However, the aequous acid solution may contain from about 5 to about 30% by weight of the acid but is preferably the 15% hydrochloric acid normally used in well acidizing.

The amount of acid may be anywhere within the range from the few hundred to the several thousand gallons ordinarily used in well-acidizing. However, our treatment is intended particularly for the zone immediately surrounding a wellbore, so that volumes are usually somewhat smaller than average. Preferably, they are from about 500 to about 5,000 U.S. gallons. Stated in another way, use of from about 10 to about 500 gallons of acid per foot of formation thickness, as recommended in U.S. Pat. No. 3,548,945 Gidley, is satisfactory.

If the octanol is to have much effect, it should be present in an amount of at least about 2%. As previously noted, this requires about 22% of the lower alcohol to solubilize the octanol in the aqueous acid solution. By use of at least about 32% by volume of isopropanol, any amount of octanol can be solubilized. Use of about 5% octanol and 25% isopropyl alcohol is preferred. This is principally for economic reasons since the cost of the isooctyl alcohol is considerably greater than either the cost of the isopropyl alcohol or the acid solution.

It is usually best to pre-mix the alcohols before adding them to the acid in order to avoid imbalance between the alcohols which could result in the formation of a two-phase system. These mixed alcohols are then added to acid with agitation to prepare a uniform treating solution. The volume of mixed alcohols is ordinarily less than the volume of aqueous acid solution, since action of the acid on solid constituents of the formation is usually the principal desired function. In some cases, however, the action of the alcohols on emulsions and organic materials in the well and in the pores of the formation is more important. In such cases, the volume of mixed alcohols can exceed the volume of acid.

If the alcohols and acids are mixed, the amount of alcohols can vary from about 30 percent to about 70 percent by volume of the resulting solution of alcohols and acid. If a spearhead or preflush batch of alcohols precedes the acid solution, the volume of this spearhead should vary from about 10% of the volume of acid solution for large acid treatments to about 100% of the acid solution volume for small acid treatments. About the same volumes should be used for batches of alcohols used as an afterflush to displace the acid solution into the formation. Alternatively, the aromatic hydrocarbon can be used as an afterflush displacing the acid into the formation.

The aromatic hydrocarbon solvent as well as the alcohol and aqueous acid solutions are generally injected at a rate of about 0.1 to about 5 barrels per minute at pressures of the order of 500 to 2,500 psi. These injection pressures should, of course, be less than the fracture pressure and preferably below the fracture parting pressure. Advantageously, the injection steps can be temporarily stopped and the injection fluids held in place such as to soak and dissolve troublesome deposits. After placement of both the aromatic solvent and the alcohol-acid fluids, a hold at static pressure for from several hours to as much as several days is required. Usually, a 24-hour hold is sufficient.

Having thus described the details of the preferred embodiments of our invention, the following example is presented illustrating the improved method, and as such should not be interpreted as being unduly limiting.

EXAMPLE

Work in the wellbore of an oil well located in the East Velma Field of Stephans County, Oklahoma resulted in several thousand barrels of water from a higher waterflood zone entering the water sensitive Humphreys zone of the well. Prior to this accidental waterflooding, a production rate of 45 to 50 barrels of oil per day (BOPD) from the Humphreys was normal for this well. Since then, production has fluctuated between 5 and 20 BOPD. For over four years this well has resisted numerous attempts to restore production including aromatic condensate treatments, alcohol treatments, surfactant treatments, viscous oil frac and a micellar stimulation which were all failures. To this well was added 100 barrels of a petroleum condensate which contained about 16.0 volume percent aromatics (ASTM D-1019). The aromatic condensate was followed by a 1,000 gallon acidizing mixture made up of 35 volume percent of mixed alcohols (16.7 vol. % octanol and 83.3 vol. % isopropanol) and a 65 volume percent aqueous acid solution (12% by weight HCl and 3% by weight HF). A 20 barrel aromatic condensate flush was used to drive the acidizing fluid into the formation. After a 24-hour soak, the well was returned to production. The measured production rates increased from 7 BOPD and 4 MCFD, thousand cubic feet of gas per day, prior to treatment to 44 BOPD and 145 MCFD after treatment.

We claim:

1. In a process for cleaning and stimulating an oil, gas or injection well the improvement comprising introducing into said well an aromatic hydrocarbon solvent and thereafter injecting into said well an acidizing composition consisting essentially of from 30 to about 76 volume percent of an aqueous solution of a well acidizing nonoxidizing water-soluble acid and from about 70 to about 24 volume percent of a mixture of an octyl alcohol and a lower aliphatic alcohol selected from the group consisting of ethanol, the propyl alcohols and tertiary butyl alcohol, said octyl alcohol constituting at least about 2 volume percent of said composition and said lower aliphatic alcohol being present in a concentration of at least about 22 volume percent of said composition, said composition being capable of lowering the interfacial tension between the oil in said formation and said composition without the use of an added surface-active agent.

2. A process of claim 1, wherein the octyl alcohol component consists essentially of a mixture of unsubstituted eight carbon atom alcohols.

3. A process of claim 1, in which the acid is selected from the group consisting of hydrochloric acid, hydrofluoric acid, and mixtures thereof.

4. A process of claim 1, in which the lower aliphatic alcohol is isopropyl alcohol.

5. A process of claim 4, in which the isopropyl alcohol is present in a concentration of at least about 32 percent by volume.

6. A process of claim 5, wherein said aromatic hydrocarbon is benzene, toluene or xylene.

7. A process of claim 1, wherein said acidizing composition is a single phase acidizing solution consisting essentially of 15% aqueous hydrochloric acid, isooctyl alcohol and isopropyl alcohol, the composition of said solution defining a point falling to the left of the phase boundary line of the ternary diagram shown in the accompanying drawing.

8. A process of claim 7, wherein said aromatic solvent contains from about 0.05 to about 1.0 volume percent of an organic amine having less than about eight carbon atoms per molecule.

9. A process of claim 8, wherein said aromatic solvent is xylene.

10. In a process for cleaning and stimulating an oil, gas or injection well the improvement comprising, introducing into said well an acidizing composition consisting essentially of from 30 to about 76 volume percent of an aqueous solution of a well acidizing nonoxidizing water-soluble acid and from about 70 to about 24 volume percent of a mixture of an octyl alcohol and a lower aliphatic alcohol selected from the group consisting of ethanol, the propyl alcohols and tertiary butyl alcohol, said octyl alcohol constituting at least about 2 volume percent of said composition and said lower aliphatic alcohol being present in a concentration of at least about 22 volume percent of said composition, said composition being capable of lowering the interfacial tension between the oil in said formation and said composition without the use of an added surface-active agent and injecting an aromatic hydrocarbon solvent after the injection of said acidizing composition.

11. A process of claim 1, wherein the aromatic hydrocarbon solvent contains at least about ten volume percent aromatics.

* * * * *